March 3, 1936.                H. A. FARRAND                2,033,026
                                 RULE
                     Original Filed April 19, 1932
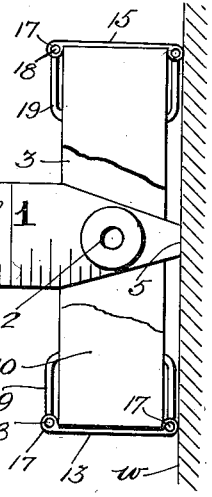
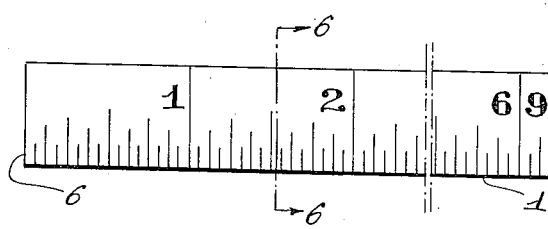
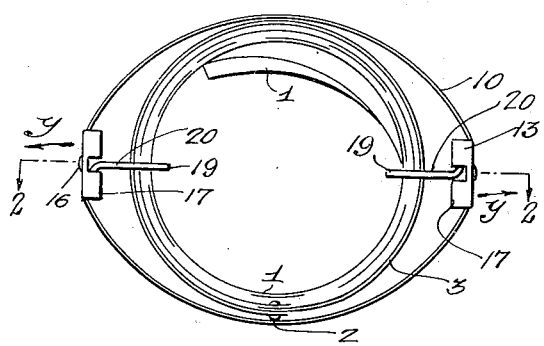
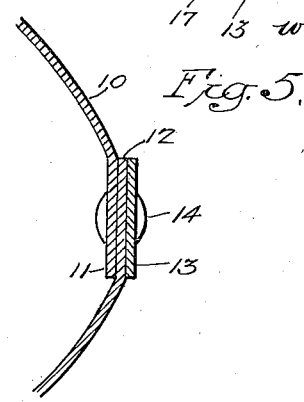
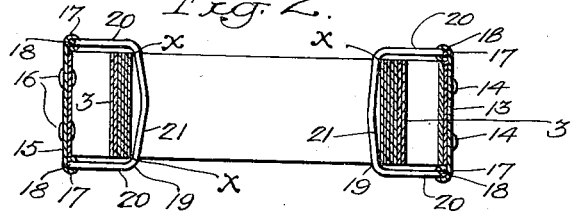
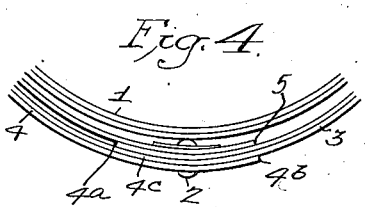
Inventor
Hiram A. Farrand
by his Attorneys
Howson & Howson Patented Mar. 3, 1936

2,033,026

UNITED STATES PATENT OFFICE

2,033,026
RULE

Hiram A. Farrand, Berlin, N. H., assignor to Hiram A. Farrand, Inc., Berlin, N. H., a corporation of New Hampshire Original application April 19, 1932, Serial No. 606,179. Divided and this application March 30, 1933, Serial No. 663,587

8 Claims. (Cl. 33—138)

This invention relates to measuring devices, and more particularly to those of the general types respectively disclosed in U. S. Letters Patent No. 1,402,589, illustrating a concavo-convex rule strip formed into an internally wound coil within a suitable holder, and No. 1,730,199, disclosing a concavo-convex rule strip formed into an externally wound coil on the outer peripheral surface of a suitable winding drum. The present invention, however, is not restricted to use with concavo-convex rule strips, as it is equally applicable to flat coilable rule strips.

Prior to the present invention concavo-convex rule strips, in many instances, have been completely removable from the winding or coiling apparatus, in order to take advantage of the entire length of the rule strip including both of the extreme opposite ends thereof, whereby either end of the rule strip may be used in abutting relation to an object up to or from which a measurement is to be made.

Complete detachment of the rule strip from its holder or winding apparatus has certain disadvantages, such for example as loss of the holder by dropping into inaccessible places or the holder being mislaid while the rule strip is in use.

In other instances, rule strips, both flat and concaved, are permanently secured at one end to the holder or winding apparatus and in such instances the end of the rule strip which is attached to the winding apparatus is not available for use in abutting relation to an object and all abutting measurements must therefore be made with the free end of the strip. There are times when it is desirable and more convenient to make an abutting measurement with that end of the rule strip which is attached to the holder and this is impossible with permanently attached rule strips of the prior art.

The primary object of the present invention is to permanently attach a rule strip to the device employed for reducing the strip into a compact form, such as a coil internally wound, and in such a manner as to expose both ends of the rule proper for direct use in making successive end to end measurements, and to permit the making of abutting measurements starting from either end of the rule.

More specifically the object of the invention is to attach the rule strip to the holder or other winding device in such a manner that the holder may be readily moved from a position in normal coiling relation to the strip to a position out of coiling relation with the rule strip proper to expose both of the opposite ends of the rule strip proper for use simultaneously.

Another object of the invention is to provide a relatively simple inexpensive and light weight coiling apparatus in combination with the permanently attached rule strip, in order that such coiling apparatus will entail no inconvenience during the use of the rule strip.

Another object of the invention is to make the coiling apparatus of an extremely resilient and practically indestructible nature, whereby the relatively movable parts thereof will not become inoperative or relatively misplaced by dropping or by other hard usage of the device.

The present application is a division of the applicant's copending application, Serial No. 606,179 filed April 19, 1932.

Fig. 1 illustrates in side elevation a preferred form of the invention, illustrating a concavo-convex rule strip reduced to an internally wound coil;

Fig. 2 is a sectional plan view taken on the line 2—2, Fig. 1, with the rule strip in the fully coiled state;

Fig. 3 is a plan view illustrating the rule strip in its fully extended state, with a portion of the winding apparatus broken away and in such relation to the rule strip as to expose both ends of the rule strip proper and with the attached end of the strip in abutting relation to a substantially fixed object such as a wall;

Fig. 4 is an enlarged fragmentary view of the holder and wound coil at the point of attachment of the strip to the holder;

Fig. 5 is a detail sectional view of a portion of the winding apparatus illustrated in Figs. 1, 2 and 3; and Fig. 6 is a sectional view through the rule strip taken on the line 6—6, Fig. 3.

As illustrated in Figs. 1 to 6 inclusive, the preferred form of the invention comprises a rule strip or blade 1 of the concavo-convex cross-sectional type, having an inherent tendency to assume a relatively stiff rectilinear state at all times.

The rule strip 1 is pivotally attached adjacent and inwardly from one end thereof, by means of a rivet or the like illustrated at 2, to a suitable holder 3 which preferably is composed of one or more substantially concentric layers of a relatively thin, highly resilient metal strip 4, such as high carbon steel, with the opposite ends of the strip secured together, as illustrated in Figs. 1 to 4, to provide a resilient annulus constituting the holder 3 for the rule blade 1.

As shown in Figs. 1 and 4, the opposite ends 4a and 4b, and the intermediate layer 4c of the holder strip 4 are secured together by the rivet 2 which also provides the pivotal attachment for the one end 5 of the rule strip 1 with the holder 3.

The holder 3 with the rule strip 1 in coiled form, as in Fig. 1, is freely rotatably mounted within an outer carrier 10 which in the present instance consists of a strip of highly resilient metal similar to that of which the rule strip 1 and the holder or annulus 3 is composed, the strip forming the outer carrier 10 being bent to a substantially elliptical form, within which the holder 3 is mounted, the opposite ends 11 and 12 of the carrier strip 10 being in overlapping relation to each other at one end of the said carrier and secured together and to an end plate 13 by means of rivets 14, 14.

Secured to the opposite end of the carrier 10 in diametrically opposed relation to the plate 13 is a similar plate 15 connected to the carrier strip 10 as by rivets 16, 16.

At and beyond the opposite substantially parallel sides of the carrier 10 the plates 13 and 15 respectively are provided with bosses 17, 17 in which are secured the opposite ends 18, 18 of bridge elements or wires 19, 19 which are provided with side arms 20, 20 that project toward the center of the apparatus at and substantially parallel to the opposite sides respectively of the outer carrier 10, the holder 3 and the coiled strip 1, thereby confining the holder 3 and the coiled strip 1 to rotation within the plane of the carrier 10.

The inner ends of the arms 20, 20 of the bridge elements 19 are connected by cross members 21, 21 which pass transversely through the apparatus within the innermost convolution of the coiled rule strip 1, and impinge upon the said inner convolution of the coiled rule strip 1 at the points x, x, thereby acting as a brake to prevent relative rotation between the coiled strip 1, the holder 3 and the outer carrier 10, whereby the rule strip will be maintained in any predetermined state of coiling. The inherent resiliency of the outer carrier 10 tends to elongate and correspondingly narrow the carrier and thereby moves the bridge elements 19, 19 in opposite directions radially with respect to the center of rotation of the holder 3 in the direction of the arrows y, y, Fig. 1 into braking contact with the inner convolution of the coiled rule 1, or into braking contact with the inner surface of the annulus 3 when the rule strip 1 is fully extended as in Fig. 3.

Coiling and uncoiling of the rule strip 1 is accomplished in substantially the same manner as disclosed in the first of the above-mentioned Letters Patent, the side arms 20, 20 and the cross member 21 of either of the bridge elements 19, 19 cooperating with the holder 3 to reduce the rule strip into a compact internally wound coil, as in the first of the above-mentioned Letters Patent. The brakes as constituted by the bridge elements 19, 19 are released during the coiling and uncoiling of the rule strip by exerting inward pressure on the end plates 13 and 15 toward the center of the device whereby the bridge elements are released from the rule strip, the outer carrier 10 being reduced lengthwise and expanded crosswise, from the state illustrated in Fig. 1, to permit relative free rotation between the holder 3 and the carrier 10.

The pivotal connection afforded by the rivet 2 between the end 5 of the rule strip 1 and the annulus or holder 3 permits the winding apparatus, including the holder 3 and the outer carrier 10, to be turned from a normal coiling relation relative to the rule strip 1 to a position substantially at 90° to the rule strip 1 as illustrated in Fig. 3, whereby the free end 6 and the attached end 5 of the rule strip 1 are exposed for making a series of end to end measurements or whereby the attached end 5 of the rule strip 1 may be abutted against an object such as a wall w (see Fig. 3) without interference from the coiling apparatus, it being noted that the end 5 of the rule strip extends at least to the plane or beyond the plane of the outermost edge of the coiling apparatus when said coiling apparatus is turned at right angles to the rule strip 1 in the manner illustrated in Fig. 3.

I claim:

1. The combination of a coilable rule strip, an annulus pivotally attached to the rule strip adjacent one end thereof, a carrier for and in substantially the same plane as the annulus, and means including a bridge element projecting from the carrier and into the annulus for confining the annulus to rotation substantially in the plane of the carrier, said bridge element cooperating with the annulus to reduce the rule strip to a coil carried by the annulus.

2. The combination of a coilable rule strip, a resilient annulus pivotally attached to the rule strip adjacent one end thereof, a resilient carrier extending around the annulus in substantially the same plane as the annulus, and a plurality of bridge elements extending inwardly from the carrier and transversely through the annulus confining the annulus to rotation within the carrier and cooperating with the annulus to reduce the rule strip to a coil carried by the annulus.

3. The combination of a coilable rule strip, a resilient annulus pivotally attached to the rule strip adjacent one end thereof, a resilient carrier encircling the annulus in substantially the same plane as the annulus, a pair of diametrically opposed bridge elements extending inwardly from the carrier and transversely through the annulus confining the annulus to rotation within the carrier and cooperating with the annulus to reduce the strip to a coil carried by the annulus.

4. The combination of a coilable rule strip, a resilient annulus pivotally attached to the rule strip adjacent one end thereof, a resilient carrier of substantially elliptical form encircling the annulus in substantially the same plane as the annulus, a pair of diametrically opposed bridge elements parallel to the longer dimension of the elliptical carrier and extending inwardly from the opposite ends of the carrier respectively and transversely through the annulus confining the annulus to rotation within the carrier and co-operating with the annulus to reduce the strip to a coil carried by the annulus, the transversely extending portions of said bridge elements being arranged to impinge upon the annulus and the inner convolution of the coiled rule to arrest movement of the rule and the annulus respectively with respect to the carrier.

5. The combination of a coilable rule strip, an annulus open at both sides adapted to be engaged by one end of the rule strip, a correspondingly open carrier for and in substantially the same plane as the annulus, and means including a bridge element projecting from the carrier and through the opening of the annulus for confining the annulus to rotation substantially in the plane of the carrier, said bridge element cooperating with the annulus to reduce the rule strip to a coil carried by the annulus.

6. The combination of a coilable rule strip, a resilient annulus adapted to be engaged by one end of the rule strip, a resilient carrier extending around the annulus in substantially the same plane as the annulus, and a plurality of bridge elements extending inwardly from the carrier and transversely through the annulus confining the annulus to rotation within the carrier and cooperating with the annulus to reduce the rule strip to a coil carried by the annulus.

7. The combination of a coilable rule strip, a resilient annulus adapted to be engaged by one end of the rule strip, a resilient carrier encircling the annulus in substantially the same plane as the annulus, a pair of diametrically opposed bridge elements extending inwardly from the carrier and transversely through the annulus confining the annulus to rotation within the carrier and cooperating with the annulus to reduce the strip to a coil carried by the annulus.

8. The combination of a coilable rule strip, a resilient annulus adapted to be engaged by one end of the rule strip, a resilient carrier of substantially elliptical form encircling the annulus in substantially the same plane as the annulus, a pair of diametrically opposed bridge elements parallel to the longer dimension of the elliptical carrier and extending inwardly from the opposite ends of the carrier respectively and transversely through the annulus confining the annulus to rotation within the carrier and cooperating with the annulus to reduce the strip to a coil carried by the annulus, the transversely extending portions of said bridge elements being arranged to impinge upon the annulus and the inner convolution of the coiled rule to arrest movement of the rule and the annulus respectively with respect to the carrier.

HIRAM A. FARRAND.